United States Patent [19]

Livingstone et al.

[11] Patent Number: 5,339,327

[45] Date of Patent: Aug. 16, 1994

[54] METAL VAPOUR LASER APPARATUS

[75] Inventors: Ewan S. Livingstone, Chelmsford; Graeme L. Clark, Basildon, both of United Kingdom

[73] Assignee: EEV Limited, Chelmsford, United Kingdom

[21] Appl. No.: 89,440

[22] Filed: Jul. 12, 1993

[30] Foreign Application Priority Data

Jul. 30, 1992 [GB] United Kingdom ............... 9216270

[51] Int. Cl.$^5$ .......................... H01S 3/22; H01S 3/223
[52] U.S. Cl. ................................ 372/56; 372/60
[58] Field of Search ................. 372/56, 57, 58, 59, 372/60

[56] References Cited

U.S. PATENT DOCUMENTS

| | | |
|---|---|---|
| 4,328,464 | 5/1982 | Pivirotto . |
| 4,347,613 | 8/1982 | Pivirotto . |
| 4,434,492 | 2/1984 | Benard et al. ........................ 372/56 |
| 4,951,297 | 8/1990 | Gole et al. ............................ 372/56 |
| 4,955,033 | 9/1990 | Maitland et al. ..................... 372/56 |
| 4,958,356 | 9/1990 | Tanuma ................................ 372/59 |
| 5,005,181 | 4/1991 | Yoshioka et al. .................... 372/57 |
| 5,220,574 | 6/1993 | Voss et al. ........................... 372/57 |

*Primary Examiner*—Rodney B. Bovernick
*Assistant Examiner*—Robert E. Wise
*Attorney, Agent, or Firm*—Spencer, Frank & Schneider

[57] ABSTRACT

Metal vapor laser apparatus includes a laser tube and a reactor chamber in which is contained metal which may be copper in the form of granules. Neon is introduced via one input port of the chamber and a halogen or halogen donor gas through another input port. A coil surrounds the reactor chamber and provides heating to its interior. The gas passes over the metal to form metal halide at its surface and is vaporized by the heating effects. The buffer gas and metal halide are then transmitted via a conduit into the laser tube where dissociation of the metal halide and subsequent excitation of metal vapor is carried out to produce laser radiation.

11 Claims, 3 Drawing Sheets

METAL VAPOUR LASER APPARATUS

FIELD OF THE INVENTION

This invention relates to metal vapour laser apparatus.

BACKGROUND OF THE INVENTION

In one known type of metal vapour laser, solid metal is distributed along the length of a laser tube. The metal vapour used in the lasing process is produced by heating the solid metal, the vapour then being excited to obtain a population inversion and laser action. The operating temperatures of such lasers having copper vapour as the amplifying medium are typically around 1500° C. Considerable thermal insulation is required around the laser tube to maintain these conditions.

In another known type of metal vapour laser, the metal vapour which is used as the laser amplifying medium is derived from a metal halide compound. For example, copper vapour may be derived from copper bromide which is introduced into a laser tube and subsequently heated to cause it to vaporise and dissociate. The temperatures required for efficient operation of a metal halide laser are lower than those for metal vapour lasers in which the vapour is derived from solid metal charges, for example a laser employing copper bromide need be heated to only around 600° C. The amount of thermal insulation required is thus reduced and fast start up times may be achieved.

The present invention seeks to provide an improved metal vapour laser apparatus.

SUMMARY OF THE INVENTION

According to the invention, there is provided metal vapour laser apparatus comprising: means for passing a halogen or halogen donor gas over the surfaces of metal in a chamber to produce metal halide; a laser tube; means for introducing the metal halide into the laser tube from the chamber; and means for dissociating the metal halide to produce metal vapour for use in the laser process.

A halogen donor gas is a halogen compound, such as hydrogen bromide, which readily dissociates to give halogen molecules or ions. The metal is advantageously copper although other metals such as gold may be used. Only one metal or a mixture of metals may be employed depending on the wavelengths of laser radiation it is wished to generate. The halogen, or halogen donated, may be bromine, chlorine or some other suitable element from that group.

The metal may be contained within the chamber and in addition, or alternatively, may form surfaces of the chamber itself, in which case the chamber walls are of the metal or have a coating of the metal. The chamber may be located remote from the laser tube with a suitable connection between them or may open immediately into the laser tube. For example, the chamber may constituted by a conduit which also functions as an input port of the laser tube.

By employing the invention, it is possible to produce a high purity metal halide, enabling the laser tube to be operated at a high efficiency.

The laser tube may be of a simple design as it is not necessary to accommodate a solid metal or metal halide component within it prior to laser operation. As the laser is able to operate at relatively low temperatures, it may employ a quartz envelope and it does not require extensive thermal shielding. It may be desirable in some cases to provide an oven around the laser tube, or parts of it, to reduce condensation of metal on optical surfaces.

A further advantage of the invention is that the laser tube itself may be easily portable as it does not require the large amount of thermal insulation necessary where metal vapour is produced directly from solid metal.

A particularly significant advantage of laser apparatus in accordance with the invention is that the lifetime of the tube is enhanced due to the low temperature operating regime. Furthermore, the metal may be easily replenished in the chamber as there is no need to disturb the integrity of the laser tube in order to reload. Consequently, when the metal vapour source is exhausted, the down time during which reloading takes place can be greatly reduced from say, two or more hours to only a few minutes.

Preferably, heater means are included for heating the chamber to cause the metal halide to vaporise.

In one preferred embodiment of the invention, the apparatus includes two chambers for each of which means are included for flowing a halogen or halogen donor gas over metal surfaces to produce metal halide within it and means are provided for switching between the chambers such that metal halide is introduced from one or the other into the laser tube. Thus as the metal charge of one chamber nears exhaustion, the other chamber can be switched into use so as to produce metal halide for delivery to the laser tube. Whilst the second chamber is operative, the first may be recharged and this may completely eliminate the need to interrupt laser operation.

In another advantageous embodiment of the invention, a plurality of chambers is included which are controllable such that different ones or combinations are selectable for introducing metal halide into the laser tube. Thus, if the chambers include different metals the output spectrum of the laser tube may be controlled by selecting a chamber, or chambers, having a particular metal or combination of metals within it. In another embodiment, the chambers may each contain the same metal and be selected in turn, for example.

In those embodiments where a plurality of chambers is included, the halogen, or halogen donor, gas delivered to the chambers may be derived from the same source and directed either only to those chambers, which may be all of them, from which it is wished to obtain metal halide or to each chamber irrespective of whether or not a metal halide is to be introduced from that chamber. If the gas is directed to each chamber, valve means may be included after the chamber so that the metal halide may be delivered to the laser tube or to a dump, so as to control the introduction of the metal halides to the laser tube. In other embodiments the halogen gas or halogen donor gas may be derived from different sources and may be different elements or compounds.

It is preferred that the metal has an open configuration which presents a plurality of passages to gas flowing over its surfaces. For example, it could be in the form of a wire wool, a mesh or layers of grids, hence maximising the surface area available to the reaction with the halogen or halogen donor gas. Where the gas is caused to flow through a metal mesh, for example, the open aspect of the metal is chosen so as to present a relatively large surface area whilst not significantly impeding gas flow through the chamber.

Preferably, the chamber is connected to the laser tube via a coupling which enables it to be removed, for example for replenishment of the metal, without significantly altering the pressure within the laser tube.

A buffer gas, such as neon, may be fed with the halogen gas or halogen donor gas into the chamber or may be separately fed through the apparatus to the laser tube.

BRIEF DESCRIPTION OF THE DRAWINGS

Some ways in which the invention may be performed are now described by way of example with reference to the accompanying drawings in which.

DESCRIPTION OF PREFERRED EMBODIMENTS

Figure 1:
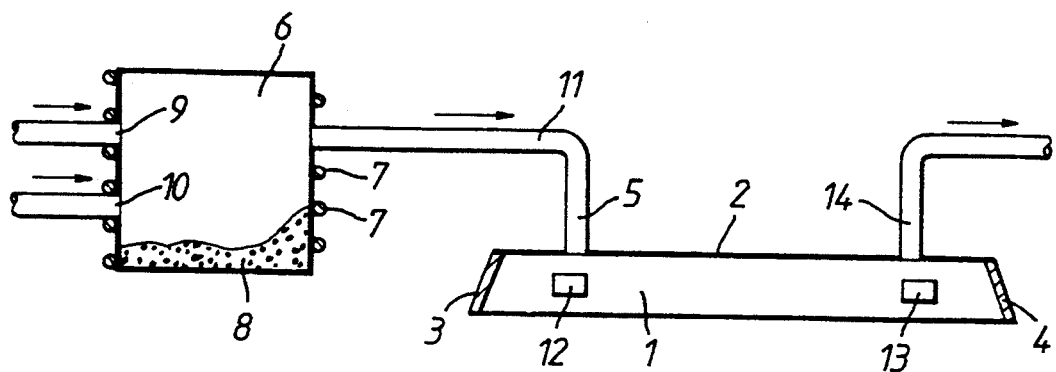
FIG. 1 schematically illustrates a laser apparatus in accordance with the invention.

With reference to FIG. 1, a copper vapour laser apparatus includes a laser tube 1 having a quartz envelope 2 and end windows 3 and 4. An input port 5 of the laser 1 is connected to a reactor chamber 6 which is surrounded by a heater coil 7. The reactor chamber 6 includes a charge of solid copper in the form of granules 8 and has two input ports 9 and 10, one of which 9 admits buffer gas, in this case neon, and the other of which 10 permits halogen or halogen donor gas to be introduced into the chamber 6. In this case, hydrogen bromide is conducted into the chamber via input port 10 and over the surfaces of the granules 8.

The hydrogen bromide reacts with the copper at the surfaces of the granules 8 to give a layer of copper bromide. The heating effect of the coil 7 vaporises the copper bromide and it is drawn out of the reactor chamber 6 with the buffer gas to flow with the buffer gas along a duct 11 and via the input port 5 into the laser tube 1.

In this embodiment of the invention, the laser tube 1 includes electrodes 12 and 13 between which a discharge is established, causing the copper bromide to dissociate into copper and bromine. The resulting copper vapour is then excited by further discharges between the electrodes 12 and 13 to establish a population inversion and laser action. The laser tube 1 includes an output port 14 through which gases and vapour are exhausted from the tube and directed towards a suitable absorber.

The apparatus may employ other suitable means for producing dissociation within the laser tube 1 and subsequent excitation of the metal vapour.

Figure 2:
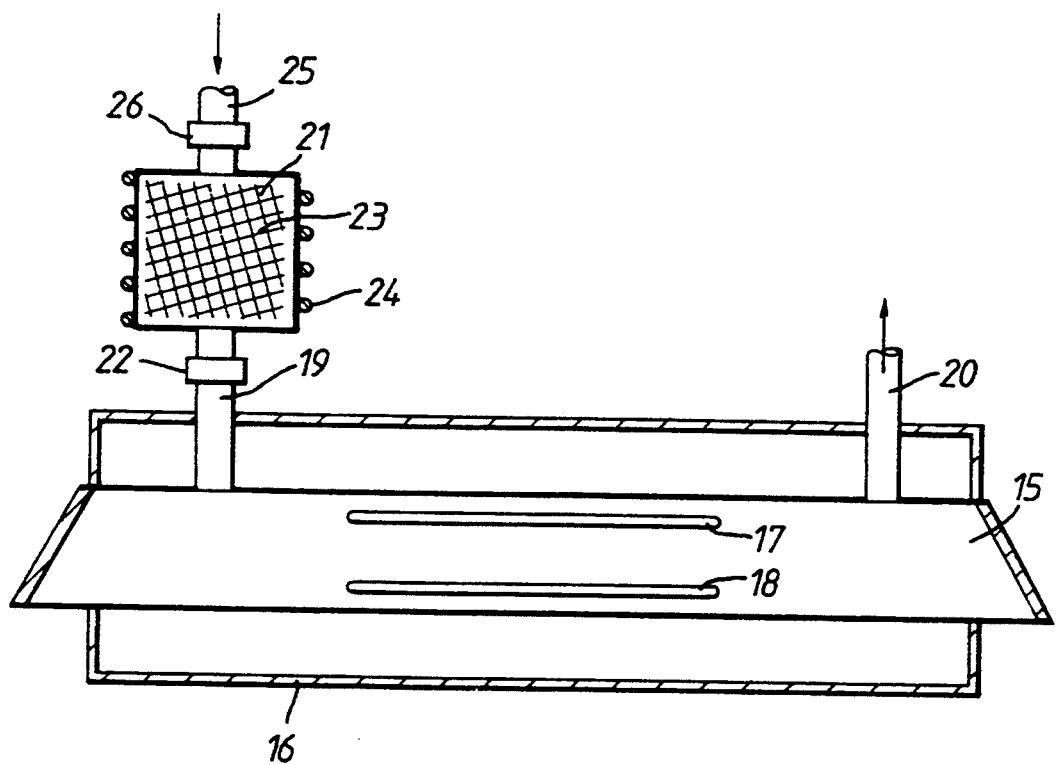
FIGS. 2, 3, 4 and 5 schematically illustrate other metal vapour laser apparatus in accordance with the invention.

With reference to FIG. 2, in another laser apparatus in accordance with the invention, the laser tube 15 is located in an oven 16 and includes electrodes 17 and 18 between which, in operation, a transverse discharge is established. The laser tube has an input port 19 and an output port 20. A cylindrical reactor chamber 21 is connected to the input port 19 via a connector 22 and is filled with a fine copper wire 23. A heater coil 24 surrounds the chamber 21.

During operation of the laser apparatus, a mixture of chlorine and neon is directed along a conduit 25 which is connected to the chamber by a coupling 26. The chlorine passes through the chamber 21, causing copper chloride to be produced at the surface of the metal 23 within the chamber 21. The temperature of the reactor chamber 21 is kept sufficiently high that the copper chloride vaporises and enters the laser tube 15. Discharges are established between the electrodes 17 and 18 resulting in dissociation of the copper chloride to produce copper vapour, which then is further excited to form a lasing medium. The oven 16 surrounding the laser tube 15 reduces the condensation of metal on optical surfaces.

When the metal within the chamber 21 is substantially exhausted, such that only small amounts of metal halide are formed, the chamber 21 is removed by closing the couplings 22 and 26, enabling the gas-tight integrity of the laser tube 15 and input conduit 25 to be maintained. The residue left in the chamber 21 is removed and a fresh charge of metal wire inserted. The chamber 21 is then coupled back into the system and laser operation can recommence.

Figure 3:
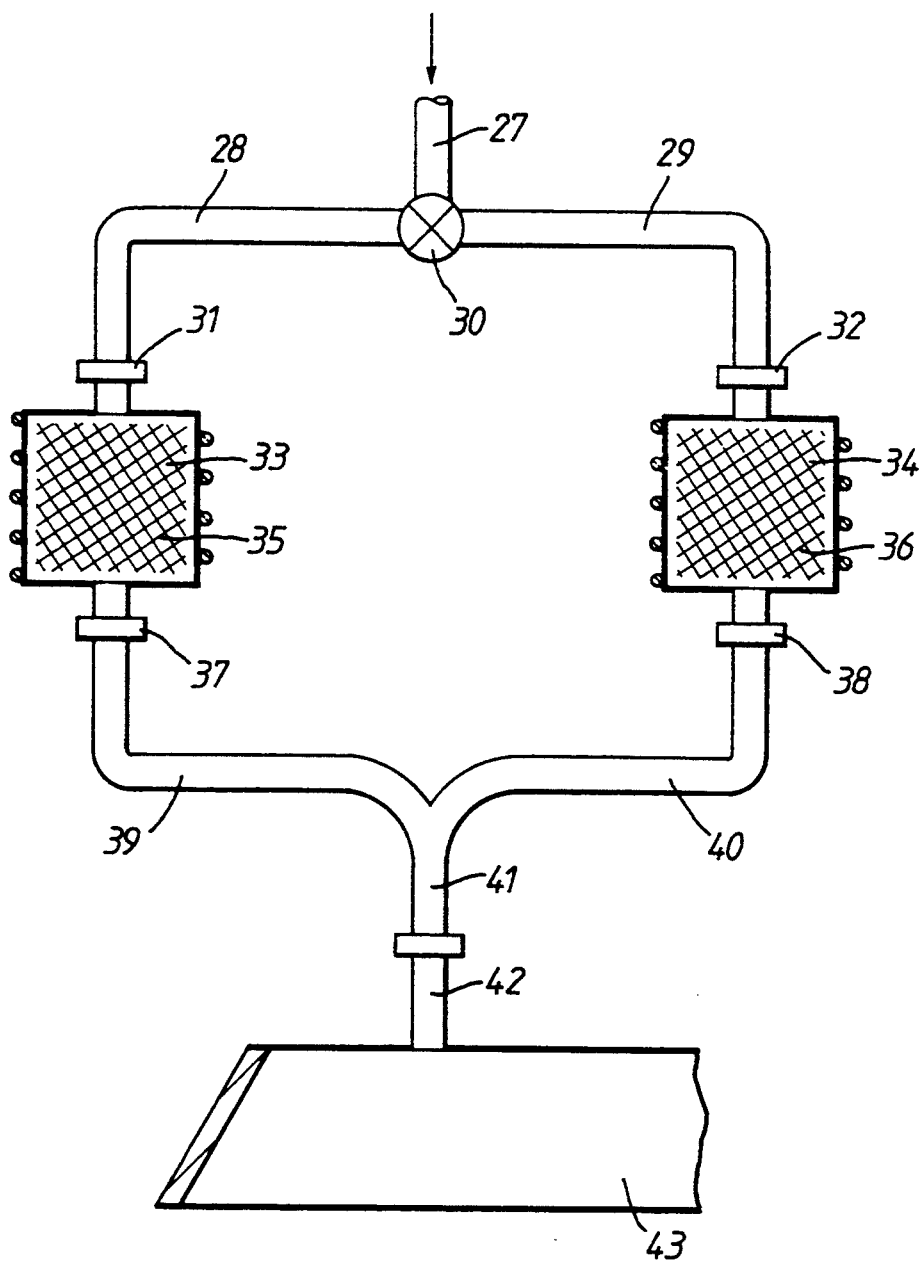

FIG. 3, illustrates another laser apparatus in accordance with the invention schematically and in part. This apparatus is particularly suitable where it is important to be able to operate the laser substantially continuously without any stoppages. The arrangement includes an input conduit 27 which is connected to two branches 28 and 29 via a regulator and switch 30. In this particular arrangement, the regulator 30 permits gases passed along input conduit 27 to be transmitted along either one branch or the other depending on its setting. In other arrangements the switch may be of a more complex nature to permit gas flowing through the input conduit 27 to be delivered to the branches in varying proportions. For example, it may be caused to flow in equal amounts between both branches or transmitted only along one branch. Each branch 28 and 29 is connected via couplings 31 and 32 to respective reactor chambers 33 and 34, each of which includes fine gold wire wool 35 and 36. The reactor chambers 33 and 34 have output ports coupled via couplings 37 and 38 to two output branches 39 and 40 respectively which combine into a single channel 41. The channel 41 is connected to an input port 42 of a laser tube 43.

During operation of the apparatus, both reactor chambers 33 and 34 are charged with gold wire. Initially, the regulator and switch 30 is set such that any gas flowing through the input conduit 27 is directed along the left hand branch 28 as shown to the reactor chamber 33. A halogen donor gas and buffer gas are passed into the reaction chamber 33 via this route, in this particular arrangement the gases being a mixture of argon and chlorine. The reactor chamber is heated and causes gold chloride formed at the surface of the wire to be vaporised. The gold chloride flows along the output branch 39 of the reactor chamber and the common channel 41 to the laser tube 43. The gold chloride is dissociated and the resulting gold vapour is excited by discharge heating or in some other suitable manner to produce laser radiation.

For a particular apparatus, it will be known what lifetime may be achieved using the amount of metal inserted within a reactor chamber. Towards the end of this lifetime, or at some other predetermined point, an operator changes the setting of the regulator and switch 30 so as to direct the gases flowing along the input duct 27 to the second reactor chamber 34 positioned on the right hand side of the apparatus as shown. This enables laser operation to be maintained with a minimal break in the delivery of gold chloride to the discharge region of the laser tube 43. Whilst the second reactor chamber 34 is providing the gold chloride for the reaction in the tube 43, the couplings on either side of the first reactor chamber 33 are closed and the chamber removed and refilled with gold wire. When the second reactor chamber 34 requires replenishment, the switch 30 is reset so as to redirect the gases to the first reactor chamber 33 once again.

Figure 4:
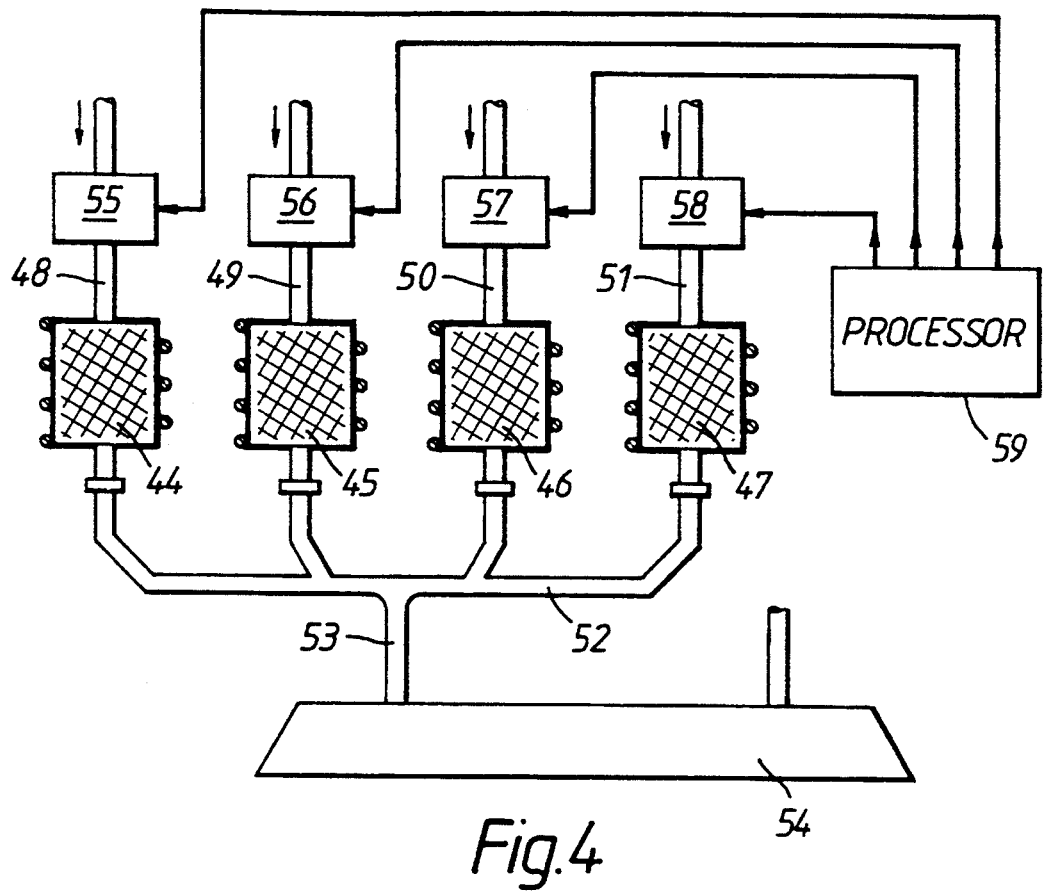

With reference to FIG. 4, another embodiment of the invention includes a plurality of reactor chambers 44 to 47 each of which has its own input conduit 48 to 51 respectively and is filled with a metal gauze. The contents of the chambers are different in each case. The outputs of the reactor chambers 44 to 47 are connected to a common manifold 52 which in turn is connected via an input port 53 to laser tube 54. Halogen gases or halogen donor gases are applied to each of the input conduits 48 to 51 through respective valves 55 to 58 which are independently controlled by a processor 59 to be closed, partially open to a variable degree or fully open, depending on the amount of metal halide it is wished to produce within each chamber. By controlling the input of the gases to the various chambers, different laser wavelengths can be produced within the laser tube 46. For example, a combination of copper and gold halides may be formed.

An arrangement such as the described with reference to FIG. 4 permits flexibility in the output of the laser to be achieved and has applications for example in the entertainment industry.

Figure 5:
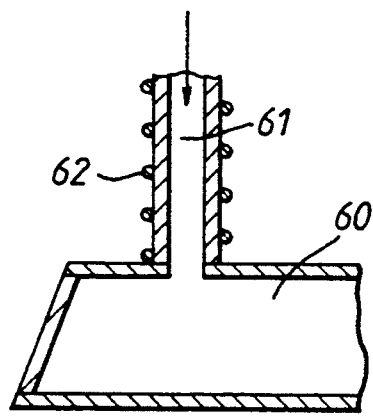

Another laser apparatus in accordance with the invention is illustrated schematically and in part in FIG. 5. This includes a laser tube 60 having an input port 61. The input port 61 is a copper tube and is surrounded by a heater coil 62. Bromine and a suitable buffer gas, such as neon, are passed through the input port 61 where copper bromide is formed on its inner surface. The heat produced by the coil 62 causes the copper bromide to vaporise and be drawn by the buffer gas flowing through the input port 61 into the laser tube 60. Electrodes within the laser tube 60 are arranged to provide discharge heating of the copper bromide to cause it to dissociate. The resulting copper vapour is then excited by further discharges between the electrodes.

We claim:

1. Metal vapour laser apparatus comprising: a chamber; means for passing a halogen or halogen donor gas over the surfaces of metal in said chamber to produce metal halide; a laser tube; means for introducing said metal halide into said laser tube from said chamber; and means for dissociating said metal halide to produce metal vapour for use in the laser process.

2. Laser apparatus as claimed in claim 1 wherein said metal is contained within said chamber.

3. Laser apparatus as claimed in claim 1 wherein said metal forms surfaces of said chamber itself.

4. Laser apparatus as claimed in claim 1 wherein said chamber opens substantially directly into said laser tube.

5. Laser apparatus as claimed in claim 1 including coupling means between said chamber and said laser tube whereby the chamber is removable without substantially altering the pressure within said laser tube.

6. Laser apparatus as claimed in claim 1 including two chambers, for each of which means are included for flowing a halogen or halogen donor gas over metal surfaces to produce metal halide within it, and means for switching between said two chambers such that metal halide is selectably introduced from one or the other chamber into said laser tube.

7. Laser apparatus as claimed in claim 6 and including coupling means between each of said chambers and said laser tube whereby each chamber is removable without substantially altering the pressure within said laser tube.

8. Laser apparatus as claimed in claim 1 and including a plurality of chambers, for each of which means are included for flowing a halogen or halogen donor gas over metal surfaces to produce metal halide within it, and means for controlling said chambers such that different ones or combinations are selectable for introducing metal halide into said laser tube.

9. Laser apparatus as claimed in claim 8 wherein said means for controlling includes valve means associated with each chamber and means for adjusting the setting of said valve means to control the amount of metal halide delivered by each chamber to said laser tube.

10. Laser apparatus as claimed in claim 1 wherein said metal in said chamber has a configuration which presents a plurality of passages to gas flowing over its surfaces.

11. Laser apparatus as claimed in claim 10 wherein said metal is in the form of a wire wool or mesh.

* * * * *